United States Patent
Wentz et al.

(10) Patent No.: US 9,456,553 B1
(45) Date of Patent: Oct. 4, 2016

(54) BALE FLIPPING APPARATUS FOR BALE SHREDDER

(71) Applicants: Ethen D. Wentz, Menno, SD (US); Walter R. Fair, Jr., Menno, SD (US)

(72) Inventors: Ethen D. Wentz, Menno, SD (US); Walter R. Fair, Jr., Menno, SD (US)

(73) Assignee: Ethen D. Wentz, Menno, SD (US)

( * ) Notice: Subject to any disclaimer, the term of this patent is extended or adjusted under 35 U.S.C. 154(b) by 0 days.

(21) Appl. No.: 14/727,197

(22) Filed: Jun. 1, 2015

(51) Int. Cl.
*A01F 29/10* (2006.01)
*A01F 29/00* (2006.01)

(52) U.S. Cl.
CPC ............. *A01F 29/10* (2013.01); *A01F 29/005* (2013.01)

(58) Field of Classification Search
CPC ... B02C 13/286; A01F 29/005; A01F 29/01; A01F 15/044; A01F 29/09; A01D 2087/128; A01D 87/127
USPC ............ 241/605, 189.1, 185.5, 186.2–186.5, 241/101.76
See application file for complete search history.

(56) References Cited

U.S. PATENT DOCUMENTS

| | | | |
|---|---|---|---|
| 3,966,128 A | 6/1976 | Anderson | |
| 4,449,672 A * | 5/1984 | Morlock | A01D 87/127 241/101.76 |
| 4,524,916 A * | 6/1985 | Keyes | A01D 87/127 241/101.76 |
| 5,090,360 A | 2/1992 | Shiba | |
| 5,090,630 A * | 2/1992 | Kopecky | A01D 87/127 241/101.76 |
| 5,209,413 A | 5/1993 | Dwyer | |
| 5,573,190 A | 11/1996 | Goossen | |
| 5,601,241 A * | 2/1997 | Brewster | A01F 29/005 241/101.76 |
| 5,653,394 A * | 8/1997 | Bussiere | A01D 87/127 241/101.742 |
| 5,676,513 A | 10/1997 | Bingham | |
| 5,865,589 A * | 2/1999 | Reyher | A01F 29/005 241/101.742 |
| 6,109,553 A * | 8/2000 | Hruska | A01F 29/005 241/189.1 |
| 6,289,798 B1 | 9/2001 | Van Der Hyde | |
| 6,517,019 B2 | 2/2003 | Johnson | |
| 6,550,704 B2 | 4/2003 | Johnson | |
| 6,886,763 B2 * | 5/2005 | Lepage | A01D 87/122 241/194 |
| 6,966,512 B1 | 11/2005 | Simpson | |
| 7,055,425 B2 | 6/2006 | Viaud | |

(Continued)

FOREIGN PATENT DOCUMENTS

WO 9403043 2/1994

OTHER PUBLICATIONS

Haybuster 2564 Balebuster, Brochure, pp. 1-4, DuraTech Industries, Feb. 2011.
Haybuster 2100 Balebuster, Brochure, pp. 1-4, DuraTech Industries, Jan. 2005.

(Continued)

*Primary Examiner* — Faye Francis
(74) *Attorney, Agent, or Firm* — Jeffrey A. Proehl; Woods, Fuller, Shultz & Smith, P.C.

(57) ABSTRACT

A bale shredder apparatus may comprise a bale hopper defining a bale chamber configured to receive a bale to be shredded and including a perimeter formed of walls with a bale feed opening formed in the perimeter and a floor positioned toward a bottom of the bale chamber. A bale shredding assembly may include a shredding rotor having a plurality of flails positioned with respect to the bale chamber to contact a bale in the bale chamber through the bale feed opening. The apparatus may include a bale flipping assembly configured to engage a bale positioned in the bale chamber of the bale hopper and flip an orientation of the bale with respect to the hopper. Optionally, the apparatus may include a primary bale movement assembly positioned toward the chamber bottom to move a bale in the bale chamber toward the shredding rotor of the bale shredding assembly.

18 Claims, 5 Drawing Sheets

(56) References Cited

U.S. PATENT DOCUMENTS

| | | | |
|---|---|---|---|
| 7,156,333 B2* | 1/2007 | Lepage | A01D 87/122 241/101.761 |
| 7,337,603 B2 | 3/2008 | Johnson | |
| 7,566,019 B1 | 7/2009 | Dueck | |
| 7,651,043 B2 | 1/2010 | Hoovestol | |
| 7,793,873 B2 | 9/2010 | Hoovestol | |
| 7,815,136 B2 | 10/2010 | Arnston | |
| 8,066,208 B2 | 11/2011 | Bennett | |
| 2005/0017108 A1 | 1/2005 | Helmeczi | |
| 2005/0205706 A1* | 9/2005 | Lepage | A01F 29/09 241/30 |
| 2012/0233962 A1 | 9/2012 | Bennett | |
| 2013/0193247 A1* | 8/2013 | Graham | A01F 29/005 241/280 |

OTHER PUBLICATIONS

Roto-Slicer Processor, Operation & Service Manual, pp. 1-29, DewEze Manufacturing, Publication #600001, Mar. 2002.
Super Slicer II, Brochure, DewEze Manufacturing, p. 13.
Roto-Cut Processor, Operation & Service Manual, pp. 1-29, DewEze Manufacturing, Publication #400001, Jul. 2001.
Haybuster 2800 Balebuster, Brochure, pp. 1-2, DuraTech Industries, Feb. 2005.
Haybuster 2650 Balebuster, Brochure, pp. 1-6, DuraTech Industries, Jul. 2005.
Haybuster 2655 Balebuster, Brochure, pp. 1-2, DuraTech Industries, Jul. 2009.
Haybuster 2564 Balebuster product information, webpage, www.haybuster.com/hb/bb2564.html, download date Apr. 8, 2013.

* cited by examiner

BALE FLIPPING APPARATUS FOR BALE SHREDDER

BACKGROUND

Field

The present disclosure relates to bale processors and shredders, and more particularly pertains to a new bale flipping apparatus for bale shredder for facilitating handling of rectangular bales in a hopper intended for handling round bales.

SUMMARY

In one aspect, the present disclosure relates to a bale shredder apparatus that may comprise a bale hopper defining an interior bale chamber configured to receive a bale to be shredded, with the bale hopper having an upper opening into the bale chamber and a chamber bottom positioned opposite of the upper opening. The bale hopper may comprise a perimeter formed of walls with a bale feed opening formed in the perimeter and a floor positioned toward a bottom of the bale chamber. The apparatus may also include a bale shredding assembly including a shredding rotor having a plurality of flails positioned with respect to the bale chamber to contact a bale in the bale chamber through the bale feed opening. The apparatus may further include a bale flipping assembly configured to engage a bale positioned in the bale chamber of the bale hopper and flip an orientation of the bale with respect to the hopper. In some embodiments, the apparatus may also include a primary bale movement assembly positioned toward the chamber bottom and configured to move a bale in the bale chamber toward the shredding rotor of the bale shredding assembly.

In another aspect, the disclosure relates to a method of shredding a bale, and the method may include providing a bale shredding apparatus comprising a bale hopper defining an interior bale chamber configured to receive a bale to be shredded, a bale shredding assembly including a shredding rotor having a plurality of flails positioned with respect to the bale chamber to contact a bale in the bale chamber through a bale feed opening, a primary bale movement assembly positioned toward a bottom of the bale chamber and configured to move a bale in the bale chamber toward the shredding rotor of the bale shredding assembly, and a bale flipping arm movable between a lowered position and a raised position in the bale chamber. The method may also include having the bale flipping arm in the lowered position, moving a bale into the bale chamber to position a first end portion of the bale on the bale flipping arm and position a second portion of the bale on the primary bale movement assembly, moving the bale flipping arm toward the raised position, and operating the primary bale movement assembly to move the second end portion of the bale toward the shredding rotor under the first portion of the bale to flip the bale in the bale chamber.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
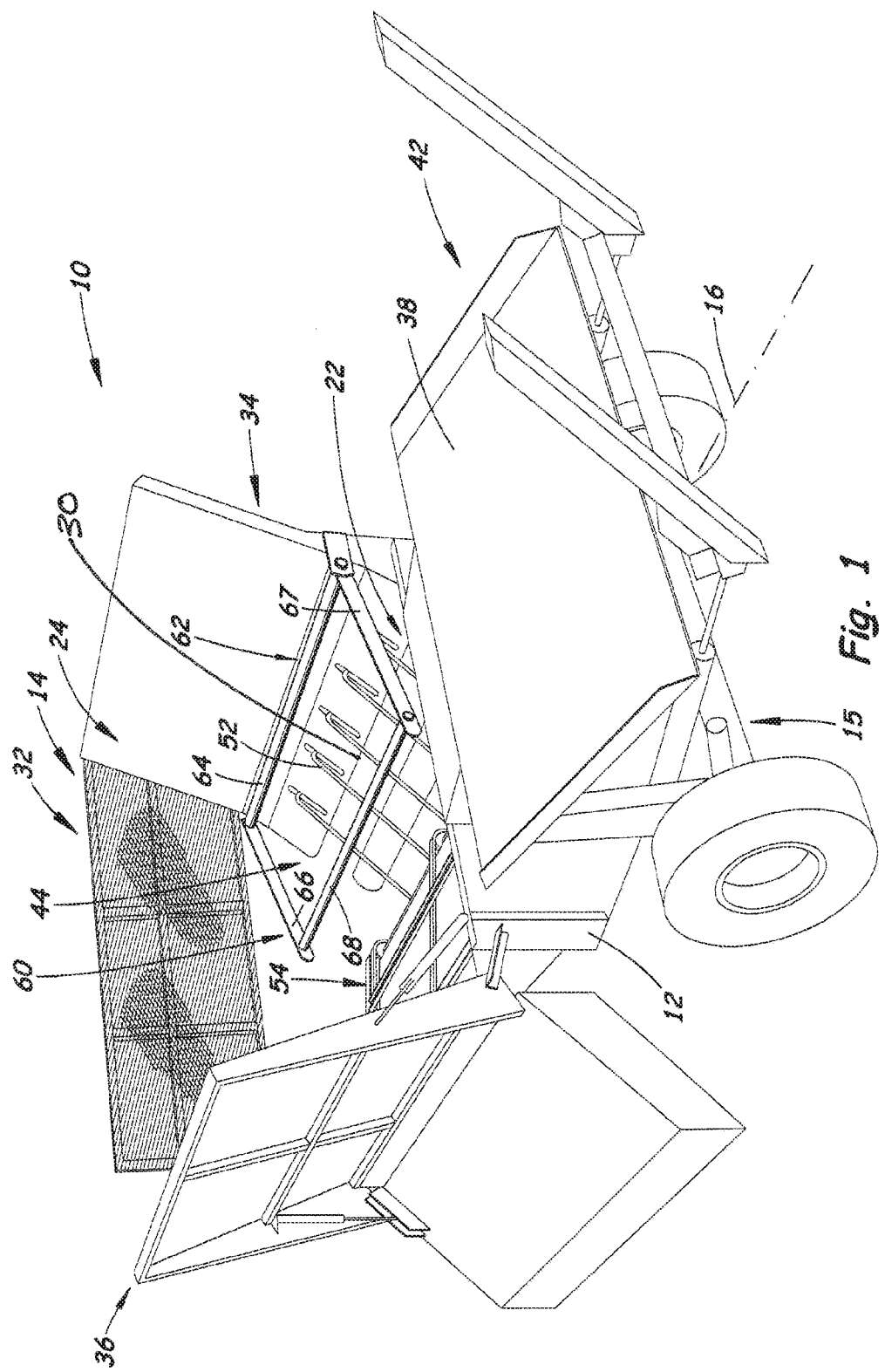
FIG. 1 is a schematic perspective view of a new bale shredder including a bale flipping apparatus according to the present disclosure.
Figure 2:
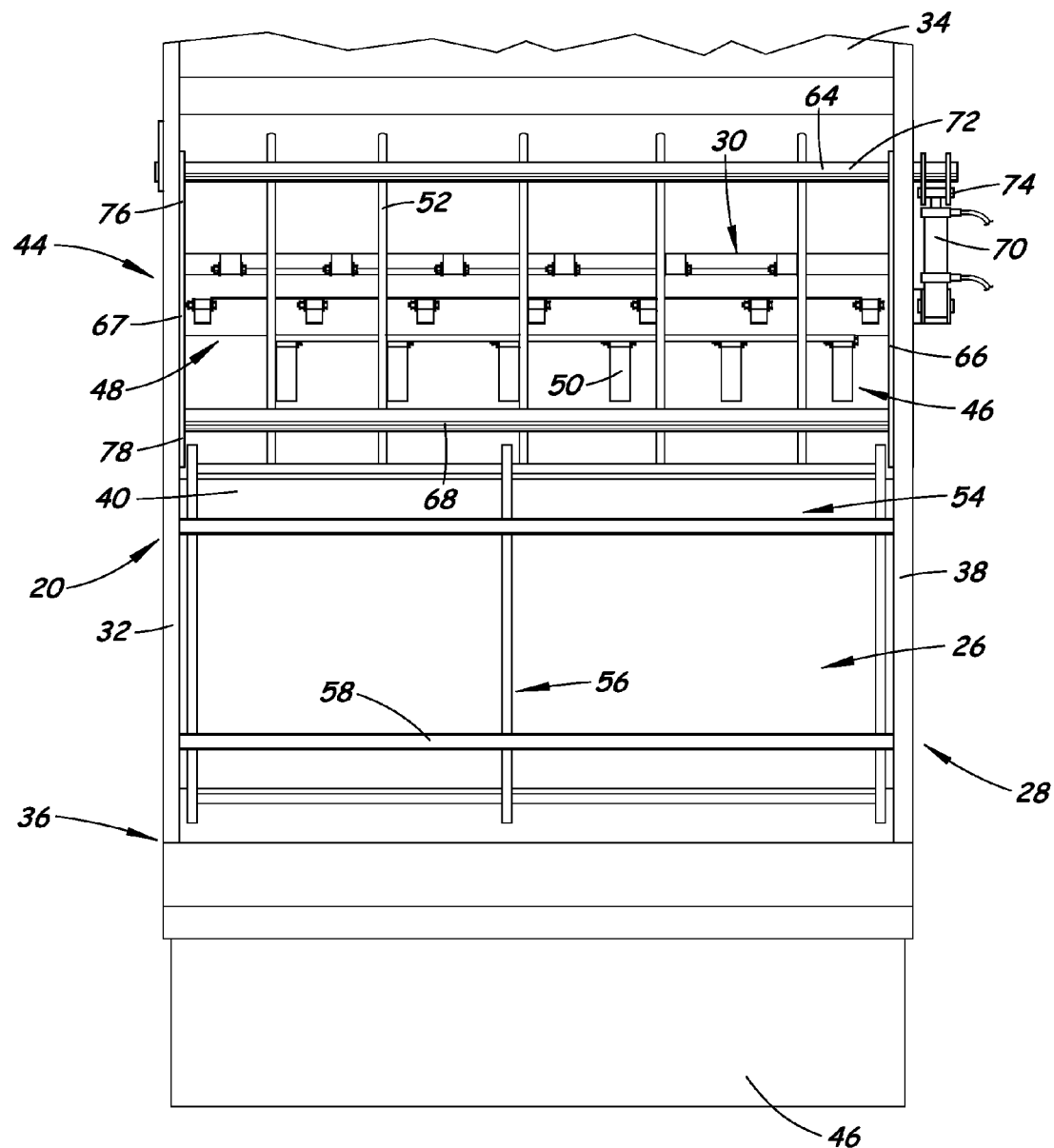
FIG. 2 is a schematic top view of the bale shredder including the bale flipping apparatus, according to an illustrative embodiment.
Figure 3A:
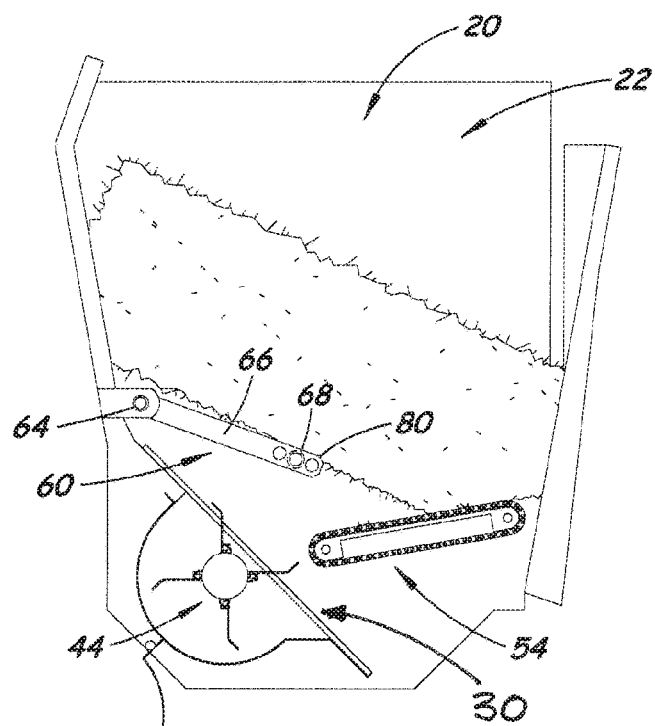
FIG. 3A is a schematic rear view of the bale shredder with the bale flipping apparatus in a relatively lowered position and a bale in a first orientation configuration.
Figure 3B:
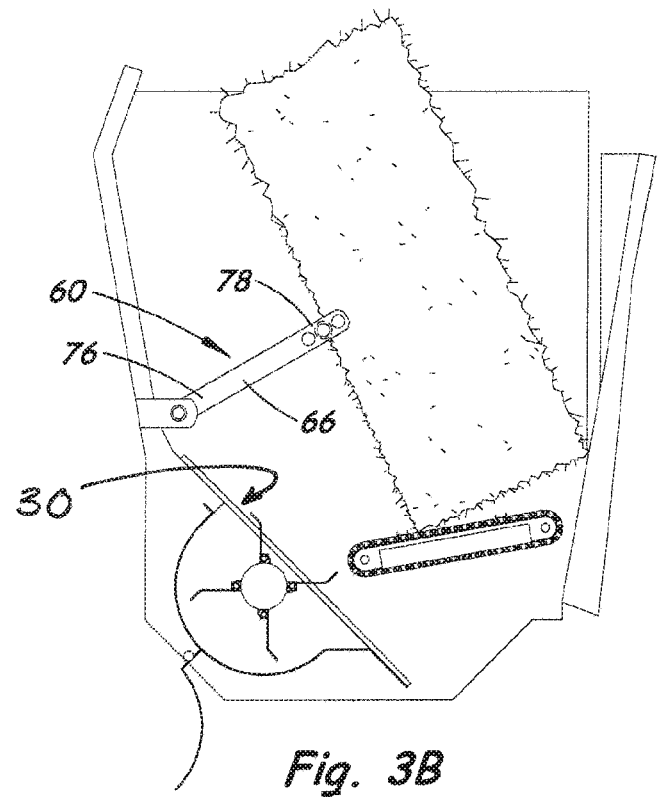
FIG. 3B is a schematic rear view of the bale shredder with the bale flipping apparatus in a relatively raised position and a bale in a second orientation configuration.
Figure 3C:
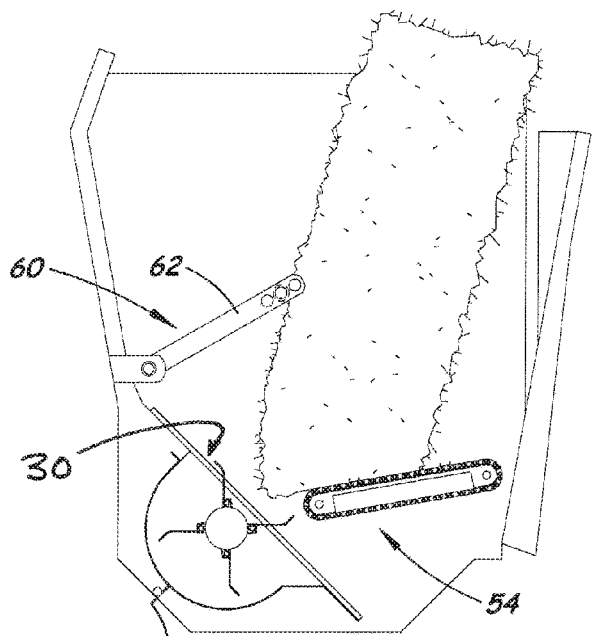
FIG. 3C is a schematic rear view of the bale shredder with the bale flipping apparatus in another relatively raised position and a bale in a third orientation configuration.
Figure 3D:
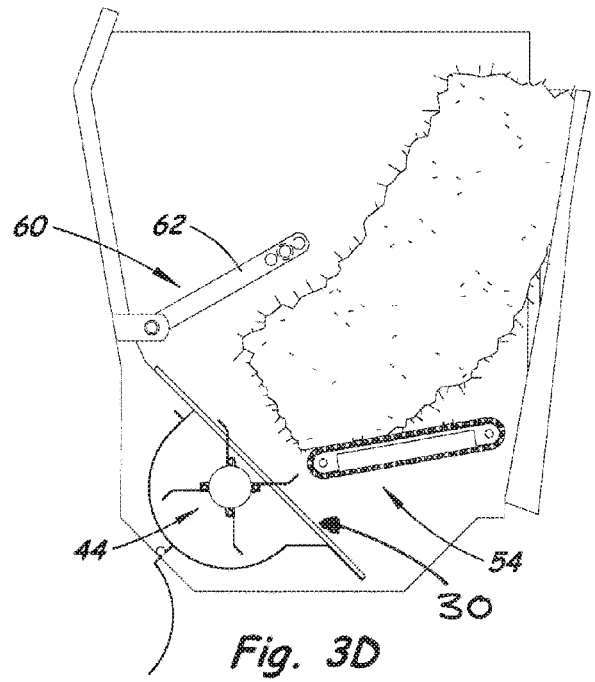
FIG. 3D is a schematic rear view of the bale shredder with the bale flipping apparatus in another relatively raised position and a bale in a fourth orientation configuration.
Figure 4:
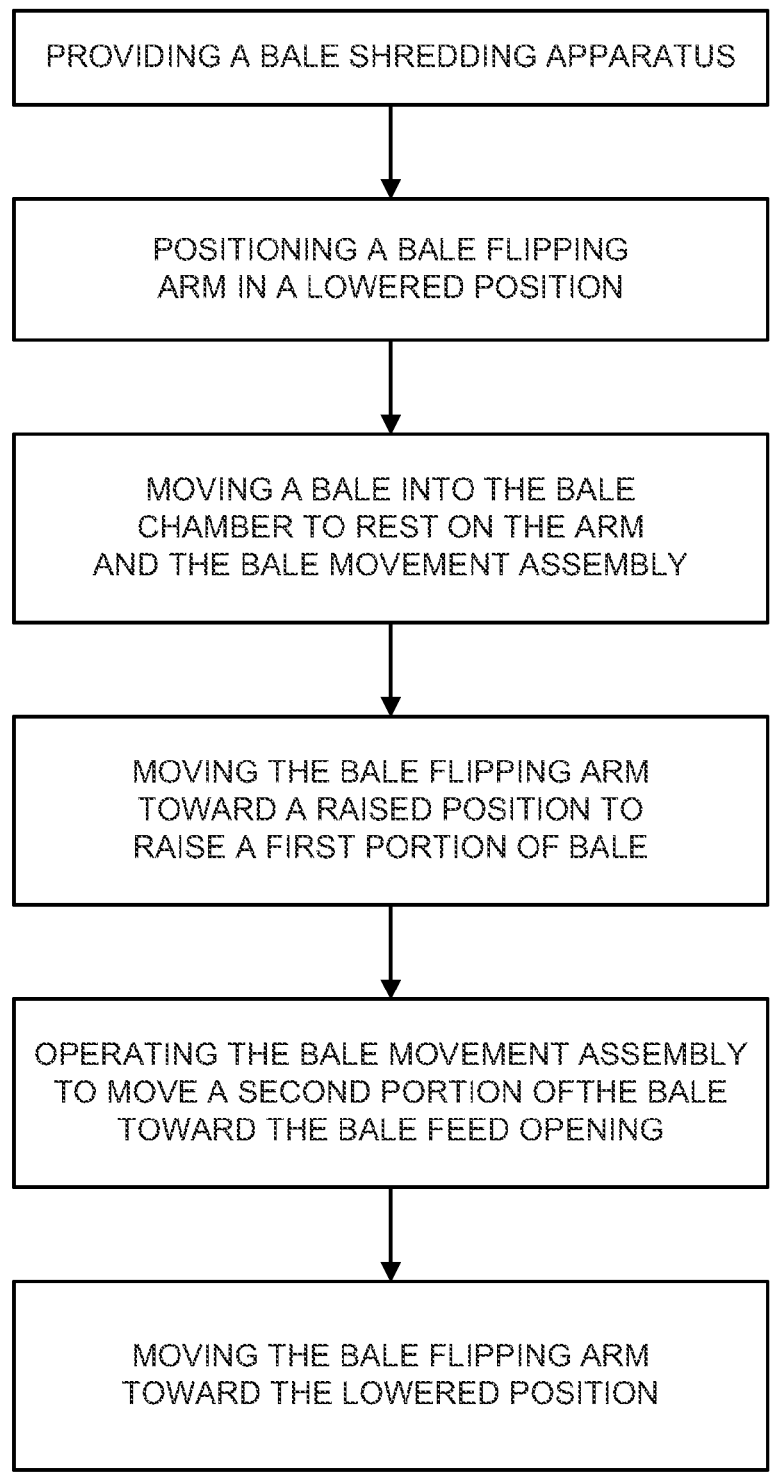
FIG. 4 is a schematic flow diagram of a method, according to an illustrative implementation.

With reference now to the drawings, and in particular to FIGS. 1 through 4 thereof, a new bale flipping apparatus for a bale shredder embodying the principles and concepts of the disclosed subject matter will be described.

It has been recognized that the processing or shredding of "square" bales having cuboid shape (e.g., a shape having six rectangular sides) presents challenges for bale processors or shredders that are designed for handling "round" bales having a cylindrical shape. While the shredding apparatus employed in bale processors is generally suitable for shredding both round and square bales, the configuration of a hopper designed for shredding round bales is not generally suitable for effectively processing the square bales. Typical square bales are elongated in one dimension and are not easily handled in hoppers that are designed for round bales that typically have diameters and lengths that are similar in size. Also, square bales can be significantly larger than round bales, especially in the elongated dimension, with some bales having dimensions as large as 4 feet by 4 feet by 8 feet.

Applicants have recognized that the heretofore developed approaches to handling square bales generally add significant expense and significant complication to the bale shredding apparatus. One approach has been to completely redesign the configuration of the bale hopper to make it bigger in order to accept the elongated square bales. Such a design results in a hopper that is more expensive to produce and purchase, relatively bulky to operate and transport, and larger than is required for handling round bales.

Another approach has been to provide a kit or modification for a round bale shredder that modifies the bale hopper such that a wall of the hopper moves outwardly to accommodate a square bale, and then moves inwardly to push the bale toward the shredding rotor. Again, this approach is a significant modification of the bale hopper that adds increased complexity and expense with respect to the design of the typical round bale processor.

Applicants have recognized that a highly preferable solution to handling a square bale in a round bale shredder does not necessarily require enlarging the hopper of the shredder, or causing walls of the hopper to move, but instead to provide the ability to reorient or "flip" the square bale such that the structure for processing the round bales is able to more effectively engage the square bale and the square bale does not become lodged or hung up in a position that does not allow the shredding rotor to engage the bale. The ability to reorient or flip the bale provides the ability to handle an elongated bale in a hopper that is generally square in shape in a horizontal plane, which is typical for round bale processors. In this context, "flipping" the bale may have the meaning of rotating the bale end over end such that the bale is turned about an axis transverse to a longitudinal axis of the bale. The longitudinal or longest axis of the bale is thus rotated in a substantially vertical plane.

In one aspect, the disclosure relates to a bale shredder 10 for generally shredding or pulling pieces of crop material off of a bale that may be comprised of hay or straw or other similar material. The bale shredder may include a frame 12 with a front 14 and a rear 15 with a longitudinal axis 16 that generally extends from the front to the rear and may generally align with a direction of movement of the frame when the shredder 10 is being towed or otherwise moved. The frame 12 may have lateral sides and may be supported above a ground surface by a pair of wheels which are mounted on an axle. The frame 12 may also have a hitch portion extending forwardly for connecting the frame to a complementary hitch structure on the towing vehicle.

The bale shredder 10 may also include a bale hopper 20 that is configured to receive a bale to be shredded. The bale hopper 20 may define an interior bale chamber 22, and may have an upper opening 24 and a chamber bottom 26 positioned opposite of the upper opening such that a bale may be loaded into the bale chamber 22 through the upper opening 24 and be positioned in the chamber bottom 26. The bale hopper 20 may comprise a perimeter 28 which is generally formed of walls or panels, and may have a generally rectangular configuration in a substantially horizontal cross sectional plane. The perimeter 28 may include a front wall 32 that is positioned toward the front 14 of the frame, and in some embodiments the front wall may include a reticulated portion to facilitate viewing through the front wall and into the bale chamber from a towing vehicle. The front wall 32 may also include a solid panel portion with the reticulated portion generally being located above the panel portion. The perimeter 28 may also include a primary sidewall that extends rearwardly from the front wall 32. A bale feed opening 30 may be positioned in the primary sidewall and may be positioned on a relatively lower location on the primary sidewall such that the primary sidewall extends downwardly to the bale feed opening located adjacent to or at the chamber bottom 26. The primary sidewall 34 may be oriented substantially perpendicular to the front wall 32. A secondary sidewall 36 may also extend rearwardly from the front wall and the sidewall 36 may be positioned opposite of the primary sidewall 34 on an opposite side of the bale chamber 22. The secondary sidewall may be oriented substantially parallel to the primary sidewall and may also be oriented substantially perpendicular to the front wall. The primary 34 and secondary 36 sidewalls may thus be positioned on opposite lateral sides of the longitudinal axis of the frame.

The perimeter 28 may also include a rear wall 38 that is positioned substantially opposite of the front wall with the bale chamber 22 being positioned between the front and rear walls. In some embodiments, the rear wall may be movable between a load position and a dump position, and the rear wall may be pivotable about a substantially horizontal axis to move between the load and dump positions. The load position may be characterized by the rear wall extending rearwardly from the frame, and may also extend downwardly. The dump position may be characterized by the rear wall extending upwardly from the frame to define the rear limit of the bale chamber 22. The bale hopper 20 may also include a floor 40 which is positioned toward the bottom 26 of the bale chamber, and which may have an upper surface that extends to the bale feed opening 30. The bale shredder 10 may also include a bale lift assembly 42 that is configured to lift a bale into the bale chamber, and the lift assembly 42 may be positioned toward the rear of a frame and may be movable with the rear wall 38.

The bale shredder 10 may also include a bale shredding assembly 44 which is configured to shred a bale positioned in the bale chamber. The bale shredding assembly may comprise a rotor chamber 46 which may be in communication with the bale chamber 22 through the bale feed opening 30. A shredding of the bale shredding assembly 44 may also include a shredding rotor 48 that is positioned with respect to the bale chamber so as to be able to contact a bale in the bale chamber. Illustratively, the shredding rotor is positioned in the rotor chamber, and is rotatable about a rotation axis which may be substantially horizontal. The shredding rotor may include a plurality of flails 50 that are pivotally mounted on the rotor, and may be configured to extend through the bale feed opening of the bale hopper in order to engage a bale positioned in the bale chamber 22. The bale shredding assembly 44 may also include a plurality of bale positioning members 52 that may extend across the bale feed opening, and may have an adjustable degree of protrusion from the bale feed opening in order to permit adjustment of the degree of exposure that a bale in the bale chamber has to the flails of the shredding rotor when the rotor is rotated. Rotation of the shredding rotor may also propel shredded material out of the bale shredder apparatus.

The bale shredder 10 may also include a primary bale movement assembly 54 which is configured to move a bale in the bale chamber toward the shredding rotor of the bale shredding assembly. The primary bale movement assembly 54 is generally located toward the chamber bottom 26 and may include elements that are positioned above or on the floor 40 of the bale hopper or such that a bale positioned in the bale chamber rests on at least some of the elements of the bale movement assembly 54. The primary bale movement assembly may include at least two endless belts 56 with at least an upper section of each belt moving over the floor 40. The belts 56 may extend generally transverse to the rotation axis of the shredding rotor, and in some embodiments the upper section of the belts may extend from a location generally adjacent to the second sidewall to a location generally adjacent to the bale feed opening 30. Illustratively, the belts 56 may comprise a chain of links. The primary bale movement assembly may also include at least one slat 58 that is movable by the at least two endless belts, and the slat 58 may extend generally transverse to the upper section of the endless belts such that the slat extends generally parallel to the rotation axis of the shredding rotor. The slat or slats 58 may be mounted on the belts such that movement of the belts moves the slat over the floor.

Significantly, the bale shredder 10 may also include a bale flipping assembly 60 which is configured to engage a bale positioned in the bale chamber 22 to facilitate reorienting the bale to be more effectively engaged by the bale shredding assembly 44. The bale flipping assembly 60 may extend into the bale chamber of the bale hopper, and the flipping assembly may be movable with respect to the bale hopper. The bale flipping assembly may have a lowered position and a raised position, and movement of the flipping assembly from the lowered position to the raised position may raise a portion of a bale rested on the flipping assembly to assist in the flipping movement of the bale.

In the illustrative embodiments, the bale flipping assembly may comprise a bale flipping arm 62 which is movable between the lowered position (see FIG. 3A) and the raised position (see FIG. 3B), and may be rotatable or pivotable between the positions. In some illustrative embodiments, the bale flipping arm may be rotatable in a range of approximately 30 degrees to approximately 60 degrees between the raised and lowered positions, although movement ranges exceeding 60 degrees, such as up to 90 degrees or even 120 degrees may be employed.

The bale flipping arm 62 of the illustrative embodiments may include a support member 64 which is mounted on the hopper, and may be mounted for rotation with respect to the hopper. The support member 64 may include a main shaft 72 and a lever arm 74 mounted on the main shaft to rotate with the main shaft. The main shaft 72 may be positioned generally in the bale chamber, and in some embodiments has a portion that extends outside of the bale chamber, and the lever arm 74 may be mounted on the exterior portion of the main shaft. The support member may be mounted on or positioned adjacent to the primary sidewall 34 and may extend generally parallel to the primary sidewall and generally parallel to the rotation axis of the rotor. The bale flipping arm may also include at least one lift member 66 that is mounted on the support member and may be positioned in the bale chamber 22 of the bale hopper. The lift member 66 may have a base end 76 that is mounted on the support member and a free end 78 that is located opposite of the base end. The lift member 66 may have at least one mounting hole 80 formed therein that is generally located toward the free end 78. Optionally, the lift member may have at least two mounting holes, with each of the mounting holes being located at a different distance from the support member 64. In the illustrative embodiments, a pair of lift members 66, 67 may be employed that are oriented generally parallel to each other and generally perpendicular to the support member 64.

The bale flipping arm 62 may also include a bale engaging member 68 for engaging a bale that is positioned in the bale chamber of the bale hopper. The bale engaging member may be mounted on the lift member 66, and in embodiments employing a pair of lift members 66, 67, the engaging member 68 may extend between and be mounted on the pair of lift members. The bale engaging member 68 may be oriented substantially perpendicular to the lift member or members and may be mounted on one of the mounting holes of each of the lift members. The position of the bale engaging member 68 on the lift member 66, 67 may be adjusted by mounting the bale engaging member on a different set of mounting holes of the lift members. In the illustrative embodiments three position adjustments are provided. The bale engaging member 68 may be positioned relatively closer to the shredding rotor 48 when the bale flipping arm is in the lowered position, and may be positioned relatively farther from the shredding rotor when the arm is in the raised position.

The bale flipping assembly 60 of the shredder 10 may also include an actuator 70 that is configured to move the bale flipping arm between the lowered and raised positions, and may provide the ability to adjust the arm to a variety of positions between the lowered and raised positions. The actuator 70 may be connected to the support member to rotate the support member, and may be linked to the lever arm 74 to move the lever arm and thereby rotate the main shaft of the support member. Illustratively, the actuator may be a piston and cylinder arrangement, such as one driven by hydraulic fluid or pneumatic air, but other types of actuators such as linear actuators may also be employed.

In another aspect, the disclosure relates to a method of shredding a bale (see FIG. 4) which may include providing an apparatus such as the bale shredder 10 that includes some or all of the features of the disclosed bale shredder. The method may also include having the bale flipping arm in the lowered position, which may be accomplished by moving the bale flipping arm toward the lowered position if the arm is not already in the lowered position. The bale engaging member of the bale flipping arm may thus be positioned relatively closer to the shredding rotor and the bottom of the bale chamber.

The method may also include moving a bale into the bale chamber of the bale hopper, and this may be accomplished, for example, by the bale lift assembly 42 or other assembly suitably configured to position a bale in the bale chamber. This step may include positioning a first portion of the bale on the bale flipping arm, such as by resting the first portion on the bale engaging member of the arm. This step may also include resting a second portion of the bale which is located opposite on the bale from the first portion, on the primary bale movement assembly of the bale shredder 10 such that the bale is somewhat inclined upwardly from the floor 40 to a position above and over the bale feed opening 30. In situations where the square bale is elongated in one direction, the longitudinal axis of the bale may be oriented substantially perpendicular to the longitudinal axis of the frame such that one end of the bale is positioned toward the secondary sidewall 36 and the opposite end of the bale is positioned toward the primary sidewall 34.

The method may also include moving the bale flipping arm toward the raised position as the bale is rested on the arm, which may include raising the bale engaging member which in turn may lift the first portion of the bale resting on the bale flipping arm which may cause the longitudinal axis of the bale to become relatively more vertical. The method may also include operating the primary movement assembly of the bale shredder 11 which may tend to move the second portion of a bale toward the shredding rotor as well as toward the primary sidewall. Moving the second portion of the bale in the manner described may tend to move the second portion under the first portion of the bale being supported by the bale flipping arm, and this may tend to flip or tip the orientation of the bale in the bale chamber. The flipping of the bale may result in the second portion of the bale remaining relatively vertically lower than the second portion of the bale, and position the second portion in an orientation directed toward the bale feed opening 30 while the first portion remains relatively vertically higher but resting against the secondary sidewall rather than the primary a sidewall. Moving the bale flipping arm toward the lowered position, particularly as the bale movement assembly operates, tends to move the second portion of the bale toward the shredding rotor and tends to assist in the flipping operation. The bale flipping arm may be moved to a position that is intermediate of the raised and lowered positions, which may assist in keeping the second portion of the bale in contact with the bale movement assembly as the movement assembly is operating and tending to draw the second portion into the bale feed opening 30.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bale shredder apparatus comprising:
   a bale hopper defining a bale chamber configured to receive a bale to be shredded, the bale hopper having an upper opening into the bale chamber and a chamber bottom positioned opposite of the upper opening, the bale hopper comprising a perimeter formed of walls with a bale feed opening formed in the perimeter, and a floor positioned toward a bottom of the bale chamber;
   a bale shredding assembly including a shredding rotor having a plurality of flails positioned with respect to the bale chamber to contact a bale in the bale chamber through the bale feed opening;
   a bale flipping assembly configured to engage a bale positioned in the bale chamber of the bale hopper and flip an orientation of the bale with respect to the hopper;
   wherein the bale flipping assembly comprises a bale flipping arm movable between a lowered position and a raised position in the bale chamber and being configured such that movement of the flipping assembly from the lowered position to the raised position raises a first end portion of a bale rested on the flipping assembly over a second end portion of the bale to flip the bale in the hopper; and
   wherein the bale flipping arm includes a support member rotatably mounted on the hopper and at least one lift member mounted on the support member and pivoted by rotation of the support member, the support member extending into the bale chamber.

2. The apparatus of claim 1 additionally comprising a primary bale movement assembly positioned toward the chamber bottom and configured to move a bale in the bale chamber toward the shredding rotor of the bale shredding assembly.

3. The apparatus of claim 1 wherein the bale flipping arm is configured such that movement of the flipping assembly from the lowered position to the raised position raises a first end portion of a bale rested on the flipping assembly over a second end portion of the bale to flip the bale in the hopper.

4. The apparatus of claim 1 wherein the bale flipping arm is rotatable between the raised and lowered positions.

5. The apparatus of claim 1 wherein the bale flipping arm includes a bale engaging member mounted on the at least one lift member for engaging a bale in the bale chamber.

6. The apparatus of claim 1 wherein the bale flipping arm includes a pair of the lift members and a bale engaging member mounted on the pair of lift members for engaging a bale in the bale chamber.

7. The apparatus of claim 1 wherein the bale flipping arm is positioned above the bale feed opening, and the bale flipping arm is positioned relatively closer to the bale feed opening in the lowered position and relatively farther away from the bale feed opening in the raised position.

8. The apparatus of claim 1 wherein the walls forming the perimeter of the hopper include a front wall, a primary side wall, a secondary side wall opposite of the primary side wall, and a rear wall opposite of the front wall, the bale feed opening being located in the primary side wall and the bale flipping arm being positioned adjacent to the primary side wall.

9. The apparatus of claim 1 wherein the bale flipping arm is positioned between the walls of the perimeter of the bale hopper, the bale flipping arm being movable in the bale chamber.

10. The apparatus of claim 1 wherein the bale flipping arm is movably mounted on the hopper, the bale flipping arm being movable to a position over the shredding rotor.

11. The apparatus of claim 1 wherein the bale flipping arm is movably mounted on the hopper, the bale flipping arm being movable to a position over a primary bale movement assembly configured to move a bale in the chamber toward the shredding rotor.

12. The apparatus of claim 1 wherein the bale flipping arm include a substantially horizontally oriented bar.

13. The apparatus of claim 1 wherein the bale flipping assembly comprises a bale flipping arm including a substantially horizontally oriented bar spaced from the floor.

14. A bale shredder apparatus comprising:
    a bale hopper defining a bale chamber configured to receive a bale to be shredded, the bale hopper having an upper opening into the bale chamber and a chamber bottom positioned opposite of the upper opening, the bale hopper comprising a perimeter formed of walls with a bale feed opening formed in the perimeter, and a floor positioned toward a bottom of the bale chamber;

a bale shredding assembly including a shredding rotor having a plurality of flails positioned with respect to the bale chamber to contact a bale in the bale chamber through the bale feed opening;

a bale flipping assembly configured to engage a bale positioned in the bale chamber of the bale hopper and flip an orientation of the bale with respect to the hopper; and wherein the bale flipping assembly comprises a bale flipping arm including a bar mounted on a pair of lift members, the bar being adjustably mounted on the lift members to adjust a position of the bar with respect to the shredding rotor.

15. The apparatus of claim 14 wherein the bale flipping assembly has a bale flipping arm with a lowered position and a raised position and is configured such that movement of the flipping assembly from the lowered position to the raised position raises a first end portion of a bale rested on the flipping assembly over a second end portion of the bale to flip the bale in the hopper.

16. The apparatus of claim 15 wherein the bale flipping arm is rotatable between the raised and lowered positions.

17. The apparatus of claim 1 wherein the bale flipping arm is movably mounted on the hopper, the bale flipping arm being movable downwardly to a position over the rotor.

18. A bale shredder apparatus comprising:

a bale hopper defining a bale chamber configured to receive a bale to be shredded, the bale hopper having an upper opening into the bale chamber and a chamber bottom positioned opposite of the upper opening, the bale hopper comprising a perimeter formed of walls with a bale feed opening formed in the perimeter, and a floor positioned toward a bottom of the bale chamber;

a bale shredding assembly including a shredding rotor having a plurality of flails positioned with respect to the bale chamber to contact a bale in the bale chamber through the bale feed opening;

a bale flipping assembly configured to engage a bale positioned in the bale chamber of the bale hopper and flip an orientation of the bale with respect to the hopper; and wherein the bale flipping assembly comprises a bale flipping arm with a bar movable toward and away from the shredding rotor, the bar extending across substantially an entirety of a width of the bale chamber defined by the bale hopper.

* * * * *